(12) United States Patent
Geheb et al.

(10) Patent No.: US 9,415,514 B2
(45) Date of Patent: Aug. 16, 2016

(54) SYSTEM TO MONITOR/ANALYZE ROBOT RELATED INFORMATION AND DISPLAY ON A SMART DEVICE

(71) Applicant: Fanuc America Corporation, Rochester Hills, MI (US)

(72) Inventors: Gordon Geheb, Hartland, MI (US); Jason Tsai, Bloomfield Hills, MI (US); Rick E. Wunderlich, Canton, MI (US); Yi Sun, West Bloomfield, MI (US); Don Kijek, Highland, MI (US); Isaac Eckert, Grand Blanc, MI (US); Ganesh Kalbavi, Rochester, MI (US); Ken Krause, Rochester Hills, MI (US); Judy Evans, Oakland, MI (US); Ashok Prajapati, Rochester Hills, MI (US)

(73) Assignee: Fanuc America Corporation, Rochester Hills, MI (US)

( * ) Notice: Subject to any disclaimer, the term of this patent is extended or adjusted under 35 U.S.C. 154(b) by 0 days.

(21) Appl. No.: 14/021,036

(22) Filed: Sep. 9, 2013

(65) Prior Publication Data
US 2014/0074286 A1 Mar. 13, 2014

Related U.S. Application Data

(60) Provisional application No. 61/698,081, filed on Sep. 7, 2012.

(51) Int. Cl.
G06F 19/00 (2011.01)
B25J 9/16 (2006.01)
G05B 19/409 (2006.01)

(52) U.S. Cl.
CPC .............. *B25J 9/1674* (2013.01); *G05B 19/409* (2013.01); *G05B 2219/33209* (2013.01); *G05B 2219/36163* (2013.01)

(58) Field of Classification Search
USPC ............... 700/245, 88, 264, 223, 224, 90, 96; 709/224, 202, 203, 223; 714/57; 712/29; 702/185; 340/635
See application file for complete search history.

(56) References Cited

U.S. PATENT DOCUMENTS

| | | | |
|---|---|---|---|
| 6,446,192 B1* | 9/2002 | Narasimhan et al. | 712/29 |
| 6,532,401 B2* | 3/2003 | Benson et al. | 700/245 |
| 6,785,590 B2* | 8/2004 | Kasuga et al. | 700/245 |
| 6,795,778 B2* | 9/2004 | Dodge et al. | 702/34 |
| 6,882,962 B2* | 4/2005 | Aoyama | 702/185 |
| 7,853,645 B2* | 12/2010 | Brown et al. | 709/203 |
| 8,121,729 B2 | 2/2012 | Blanc et al. | |
| 2002/0163427 A1* | 11/2002 | Eryurek et al. | 340/500 |
| 2003/0023333 A1* | 1/2003 | Birkle | 700/96 |
| 2003/0163217 A1* | 8/2003 | Nakamoto et al. | 700/108 |
| 2004/0083010 A1* | 4/2004 | Nagata et al. | 700/1 |

(Continued)

*Primary Examiner* — Ronnie Mancho
(74) *Attorney, Agent, or Firm* — Fraser Clemens Martin & Miller LLC; William J. Clemens (57) ABSTRACT

A robot monitoring system for monitoring and analyzing robot related data and displaying the data on a smart device is provided. The robot monitoring system comprises at least one robot in local communication with at least one robot controller. The at least one robot controller has local processing power for monitoring, gathering, and analyzing data related to the at least one robot. The data analysis results are formatted into a message file that is communicated to a storage system. The message file may then be retrieved by a smart device having software running thereon for displaying the results of the data analysis.

18 Claims, 4 Drawing Sheets

(56) References Cited

U.S. PATENT DOCUMENTS

| | | |
|---|---|---|
| 2005/0010311 A1* | 1/2005 | Barbazette et al. ............ 700/78 |
| 2006/0206289 A1* | 9/2006 | Stake et al. ................... 702/184 |
| 2008/0247549 A1* | 10/2008 | Blanc et al. ................... 380/277 |
| 2011/0173496 A1 | 7/2011 | Hosek et al. |

* cited by examiner

SYSTEM TO MONITOR/ANALYZE ROBOT RELATED INFORMATION AND DISPLAY ON A SMART DEVICE

CROSS-REFERENCE TO RELATED APPLICATION

This application claims priority to U.S. Provisional Application Ser. No. 61/698,081, filed Sep. 7, 2012, the entire disclosure of which is hereby incorporated herein by reference.

FIELD OF THE INVENTION

This invention relates to a system and a method to monitor/analyze robot related information and generate a robot information display on a smart device (iPhone, iPod, Android, PC or other such type device).

BACKGROUND OF THE INVENTION

The use of robotic systems in industrial applications often requires careful monitoring of the robots and other associated components due to the complexity in programming, operating, and maintaining such systems. For instance, an operator of a robotic system may want continual access to information regarding the robotic system including a current status of each robot or component in use with the system, a production status of the robotic system, a summary of process information, and diagnostics information.

In many instances, an operator of such robotic systems may be responsible for several different independent robotic systems dispersed at various different locations within a single customer site or even across multiple customer sites. Accordingly, it is advantageous to be able to monitor such systems using a portable smart device such as a mobile phone or a laptop computer, for instance.

The ability to constantly monitor multiple robotic systems and the components included therein greatly increases the efficiency in operating such a robotic system. The availability of detailed information relating to the current condition or production status of each robot within the robotic system allows the operator of the robotic system to make faster and more informed decisions. Furthermore, up to date information relating to the condition of each robot allows the operator to schedule routine or unexpected maintenance in a much more efficient and time effective manner.

Systems for monitoring and displaying robot related information are known in the art. For instance, U.S. Pat. No. 8,121,729 "Remote Diagnostic System for Robots" and US patent application publication No 2011/0173496 "Intelligent Condition Monitoring and Fault Diagnostics System for Preventive Maintenance" each disclose a method of monitoring a robotic system remotely.

U.S. Pat. No. 8,121,729 describes a remote diagnostic system for robots including at least two robots, wherein a controller of each robot of the system is locally connected to a service unit provided with local processing power. A remote service center is provided with a connector server, and a communications infrastructure for transferring packets of information between the robot controllers and the connector server via the service units for performing remote monitoring and diagnostics at the remote service center. The communications infrastructure uses Internet and/or GPRS (general packet radio service) communication lines.

Publication 2011/0173496 describes a system for condition monitoring and fault diagnosis that includes a data collection function that acquires time histories of selected variables for one or more of the components, a pre-processing function that calculates specified characteristics of the time histories, an analysis function for evaluating the characteristics to produce one or more hypotheses of a condition of the one or more components, and a reasoning function for determining the condition of the one or more components from the one or more hypotheses. In this system, the function controller collects data packets from the robot controller via various communication methods to a remote server. The information is aggregated and analyzed on the server.

The prior art robot monitoring system have several shortcomings. The service unit in the system of U.S. Pat. No. 8,121,729 is required to gather data from the associated robot. Conceptually, the service unit acts as the master of the data and requests data from the robot controller (slave). The remote service center is utilized to make the analysis. This often requires the use of an independent third-party remote server. The user of the robot system therefore does not have direct control of the server being used to monitor the robot system. Similarly, the system of Publication 2011/0173496 requires multiple controllers to collect and analyze the data and again a remote server is utilized to make the analysis. In contrast, the use of a local server to collect and analyze the data allows the customer and owner of the local server to control the data and monitor and control the access to this data.

Furthermore, the reliance of the prior art robot monitoring systems on third party controlled remote servers in many instances leads to an inability of the customer to customize the types of robot related data being monitoring by the system. This type of inflexible system leads to the customer not being able to prioritize certain types of notifications over others, or causes the system to be unable to provide information with each notification that may be deemed important by the operator of such a system.

It is desirable, therefore, to provide a localized customer server that is able to securely store and communicate data to the customer without the need for a third-party remote server while offering the customer the ability to customize the types and forms of data available for remote notification.

SUMMARY OF THE INVENTION

Compatible and attuned with the present invention, a system and method of the invention overcomes these shortcomings by providing a local robot controller having local processing power for monitoring, gathering, and analyzing robot related data to determine a condition of a robot that is communicated to a smart device.

In one embodiment, a robot monitoring system for monitoring and analyzing robot related data and displaying the data on a smart device comprises: at least one robot; and at least one robot controller in communication with the at least one robot, wherein the at least one robot controller has local processing power and is configured to monitor and analyze robot related data to determine a condition of the at least one robot, wherein the at least one robot controller further includes a communications device for communicating the condition of the at least one robot to a storage system; wherein the storage system is at least one of an email server system, a remote storage system, and a local memory of the at least one robot controller.

In another embodiment, a method for monitoring, analyzing and displaying robot related information on a smart device comprising the steps of: providing at least one robot in communication with at least one robot controller having local processing power; monitoring, gathering, and analyzing robot related data relating to the at least one robot using the local processing power of the at least one robot controller; formatting and packaging a result of the analysis of the robot related data to form a message file; communicating the message file to a storage system, wherein the storage system is at least one of an email server system, a remote storage system, and a local storage system; and communicating the message file from the storage system to a smart device.

DESCRIPTION OF THE DRAWINGS

The above as well as other advantages of the present invention will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 2:
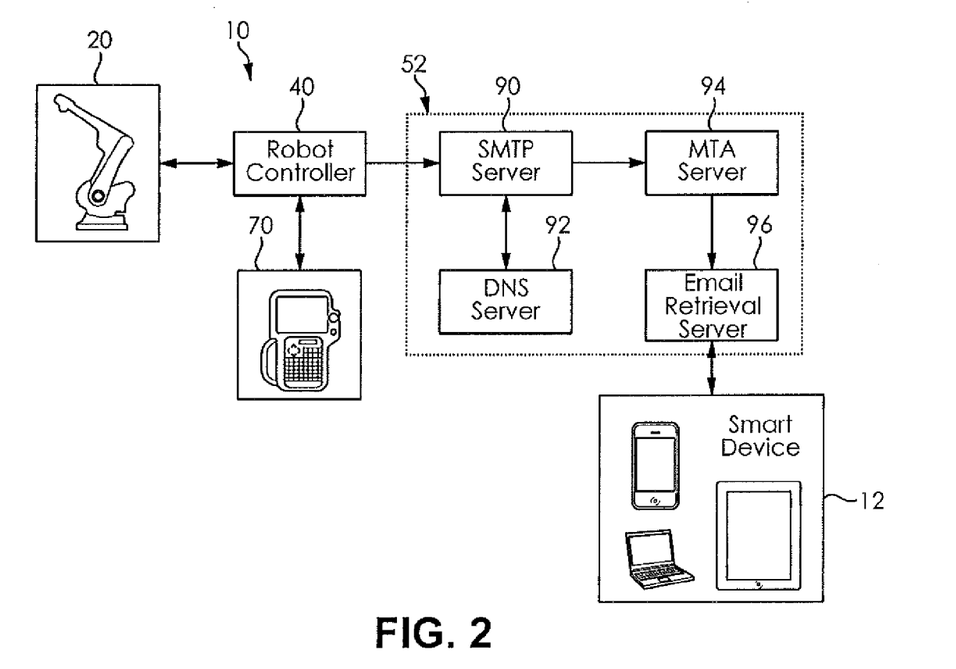
FIG. 2 is a block diagram view of the system according to the invention utilizing email communication.
Figure 3:
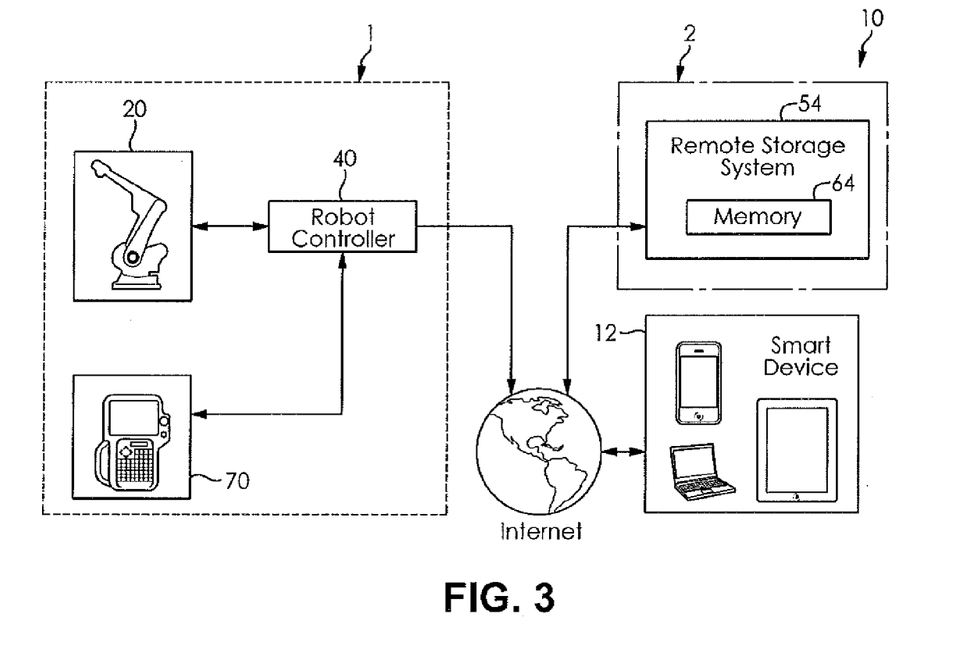
FIG. 3 is a block diagram view of the system according to the invention utilizing Internet communication with remote storage.
Figure 4:
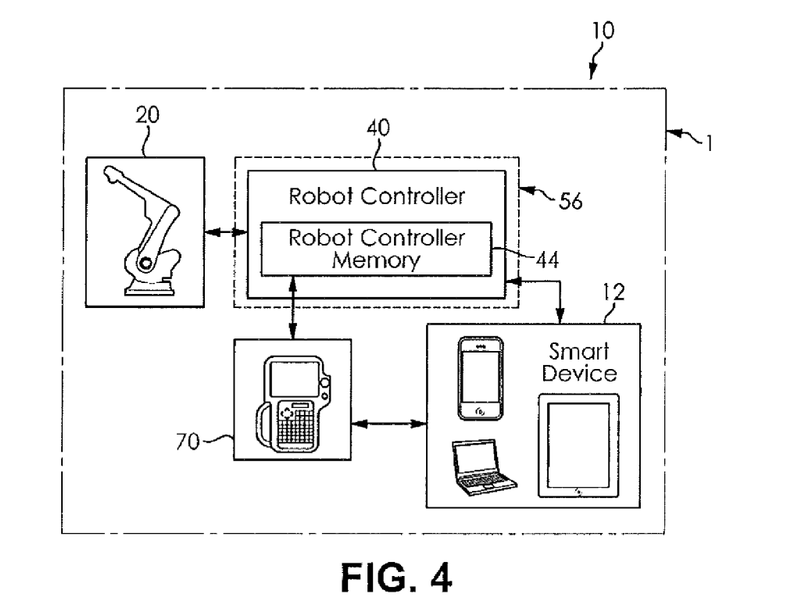
FIG. 4 is a block diagram view of the system according to the invention utilizing local communication with a local storage system.

Referring to FIGS. 1-4, the invention relates to a robot monitoring system 10 to monitor, analyze, and communicate a condition of at least one robot 20 to a smart device 12. The smart device 12 is then used to display the condition of the at least one robot 20. As used hereinafter, the term "smart device" refers to an electronic device, generally connected to other devices or networks via different protocols such as Bluetooth, NFC, WiFi, 3G, 4G, etc., that can operate to some extent interactively and autonomously, while also including a manner to communicate information to an operator visually via a display. Examples of smart devices for use with the robot monitoring system 10 include cellular phones (Apple iPhone, Android, etc.), tablets (Apple iPad, Amazon Kindle, Google Nexus, etc.), personal desktop computers, laptop computers, or any other such devices. The robot monitoring system 10 includes at least one robot controller 40 that communicates the robot condition data to a storage system 50, and the storage system 50 then communicates the robot condition data to the smart device 12. The storage system 50 may be in the form of an email server system 52 (FIG. 2), a remote storage system 54, (FIG. 3) or a local storage system 56 (FIG. 4).

Figure 1:
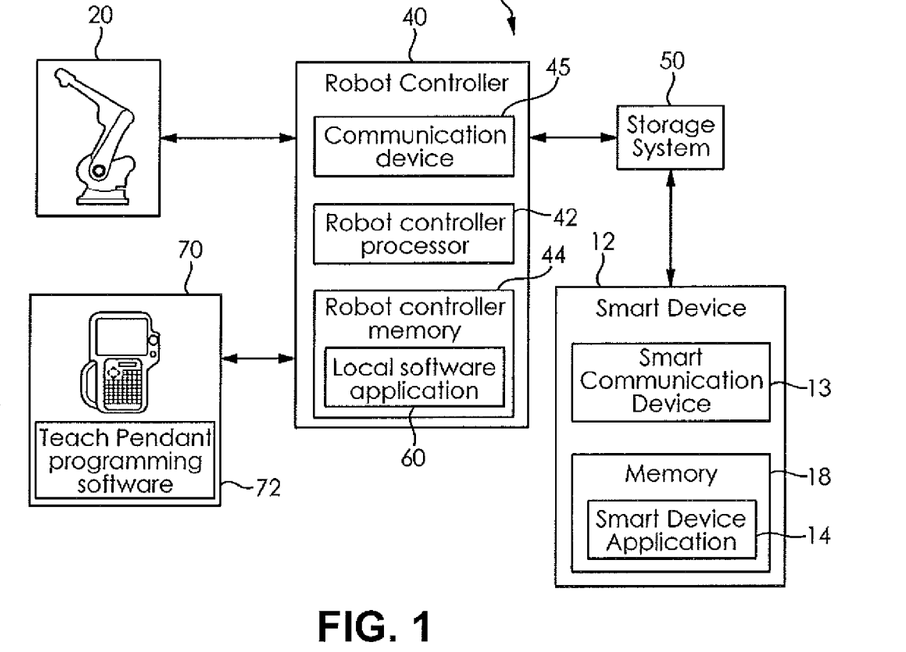
FIG. 1 is a block diagram view of the robot monitoring system according to the invention.

As shown in FIG. 1, the robot monitoring system 10 generally comprises the at least one robot 20 and the at least one robot controller 40 in communication with the at least one robot 20. The at least one robot 20 and the at least one robot controller 40 are located at a customer site 1 (FIG. 3), or, in some cases, the at least one robot 20 and the associated at least one robot controller 40 may be located at a plurality of customer sites 1 that are all in communication with a common storage system 50. The customer site 1 may be to any site where the at least one robot 20 and the at least one controller 40 have a local connection to establish communication therebetween. The local connection is typically made by means of a cable or other direct connection, but it should be understood that any known method of local data communication between the robot 20 and the robot controller 40 may be utilized, including wireless communication. The robot 20 may be any form of robot compatible with the robot monitoring system 10 and the robot controller 40, including robots 20 used for part assembly, packaging, part transfer, material removal, welding, and painting, for example.

The robot controller 40 located at the customer site 1 comprises a robot controller processor 42 having local processing power for the monitoring, gathering, and analyzing of any relevant information or data relating to the condition of the at least one robot 20, as well as a robot controller memory 44 for storing the associated data. The robot controller 40 functions as a master of the robot related data used by the robot monitoring system 10. The robot controller 40 further comprises at least one local software application 60 running on the robot controller 40 for the collection and analysis of the robot related data. The at least one local software application 60 may be stored in the robot controller memory 44 and executed by the robot controller processor 42.

The local software application 60 may be configured to cause the robot controller 40 to query the robot 20 for the robot related data whenever a predetermined trigger is activated or at the initiation or completion of predetermined tasks. Alternatively, the local software application 60 may also be configured to receive, analyze, and store the results of any robot related data communicated by the robot 20 to the robot controller 40 based on predetermined triggers defined by the robot 20. Using the at least one local software application 60, the robot controller 40 may collect data relating generally to the condition of the robot 20, such as the model of robot, the current status of the robot and its constituent components (including sensors associated with the robot), the current production status of the robot, any information relating to a process or task the robot has been configured to carry out, and any other diagnostics information that may be relevant to ascertaining the condition of the at least one robot 20.

The system 10 may further include a teach pendant 70 also having a local connection to the robot controller 40, such as a cable. The teach pendant 70 is generally a handheld controller and programming unit that aids in programming the robot 20 to perform a specified task. The teach pendant 70 includes a display and an interface for navigating and programming any software applications 72 running on the teach pendant 70. The teach pendant 70 may include software applications running thereon for communicating with the robot 20 and the robot controller 40. It should be understood that any robot related data that may be collected, received, stored, or communicated by the robot controller 40 may also be collected, received, stored, or further communicated by the teach pendant 70.

The teach pendant 70 may be used to customize the data collection of the local software application 60 running on the robot controller 40. The teach pendant 70 may include teach pendant programming software 72 that allows an operator of the teach pendant 70 to specify certain triggers that alter the operation of the robot 20 or the robot controller 40. For instance, an operator of the teach pendant 70 may specify that the robot controller 40 should cause the robot 20 to cease a specified task when an error is detected by one of the robot 20, the robot controller 40, and the teach pendant 70. Similarly, the teach pendant 70 running the teach pendant programming software 72 may be used to specify that such an error is communicated to the robot controller 40 for further communication to the storage system 50. Accordingly, the teach pendant 70 may be used as a method of customizing the type and form of robot related data communicated by the robot controller 40 to the storage system 50 for further communication to a smart device 12. It should also be understood that the type and form of robot related data may also be customized by updating, replacing, or further configuring any of the at least one local software applications 60 contained within the robot monitoring system 10 based on the preferences of an operator of the robot monitoring system 10.

As explained hereinabove, it should be understood that the robot controller 40 may be configured to gather and analyze data detected by or stored in the memory of any of the robot 20, the robot controller 40 itself, or the teach pendant 70, as desired by the operator of the robot monitoring system 10. Furthermore, it should also be understood that the collection of the robot related data may be performed by any of the at least one local software applications 60 running in isolation or in conjunction with each other, and the at least one local software application 60 may be running on any component of the robot monitoring system 10 having the necessary local processing power. In all cases, however, the robot controller 40 is used to collect and analyze all robot related data that has deemed of importance to the operator for the proper operation and maintenance of the robot monitoring system 10.

The robot related data gathered by the robot controller 40 may include a status of the robot 20, a condition of a component of the robot, a production status of the robot, a summary of process information relating to the robot, and diagnostics information relating to the robot, for example. The robot controller 40 having the local processing power performs analysis on the robot related data and the robot controller 40 sorts which robot related data is sent to a communication device 45 of the robot controller 40 for communicating the robot related data to the storage system 50. The at least one local software application 60 running on the robot controller 40 includes predetermined triggers that determine what robot related data is sent to the communication device 45. For instance, the robot controller 40 may collect and analyze data relating to the robot 20 that indicates that a component of the robot 20 is currently inoperable. The local software application 60 contained within the robot controller 40 is configured to recognize this data as robot related data that should be communicated to the storage system 50 by the communication device 45.

The robot controller 40 is further configured to format the robot related data to be stored within the storage system 50. The robot controller 40 may preferably format the robot related data format through use of at least one of the local software applications 60 running on the robot controller 40. The robot controller 40 uses a unique protocol to define different types of the robot related data for sending to the storage system 50. Every node has an identification name and an ability to store historical data in a sub-node structure. The historical data may include an identification of the robot 20 in communication with the robot controller 40, the time of the event triggering the gathering and analyzing of the robot related data, and the nature of such an event, for example. Every node further includes an associated file tag node to structure an attached file to reference specific sets of data.

The data analysis results that have been coded are packaged by the robot controller 40 for sending by the communication device 45 to the storage system 50. The local software application 60 for use with the robot controller 40 may also be configured to further query other components of the robot monitoring system 10 when a trigger has been activated to determine if additional files should be associated with and sent to the storage system 50 in addition to the data analysis results. For instance, the local software application 60 may detect that a vision system of the robot 20 has found a manufacturing error in an article being assembled by the robot 20. In such a case, the local software application 60 may query the vision system in communication with the robot 20 and the robot controller 40 and the vision system may take a digital photographic image of the article having the manufacturing error. The digital photographic image may then be included for communication with the data analysis results that triggered the taking of the digital photographic image. The attached file may need to be converted to a text only file type for sending with the robot related data in a single multi-part message.

As explained hereinabove, the robot controller 40 may be configured to communicate the condition of the robot 20 to the smart device 12 using multiple forms of data storage and communication. Accordingly, the storage system 50 may be in the form of an email server system 52, a remote storage system 54, or a local storage system 56. The storage system 50 is configured to then communicate the condition of the robot 20 to the smart device 12. Hereinafter, the term "message file" is used to refer to all robot related data indicating a condition of the robot 20 sent in a distinct communication from the robot controller 40 to the storage system 50, and then from the storage system 50 to the smart device 12. The message file 100 (FIG. 6) may include the robot related data as well as the attached file converted into a text based format, allowing the message file 100 to be sent as a single multi-part text based message.

The email server system 52 may be included entirely locally at the customer site 1, or alternatively, the email server system 52 may include components thereof located at a remote site 2. If included entirely locally, the email server system 52 may have a direct connection to the robot controller 40, such as a cable. It should be understood, however, that any form of local connection may be made, including wireless communication.

Referring now to FIG. 2, when the email server system 52 is used as the storage system 50, the communication device 45 of the robot controller 40 acts as a mail client. The communication device 45 is configured to gather and format the message file 100 as an email message for sending the message file 100 to a desired recipient email address (including a recipient name and a domain name). The message file 100 is forwarded to a Simple Mail Transfer Protocol (SMTP) server 90, a form of outgoing mail server located at the customer site 1. The SMTP server 90 may be included as a component of the robot controller 40 or may be a server located at the customer site 1 in communication with at least one of the robot controllers 40. The SMTP server 90 contacts a Domain Name System (DNS) server 92. The DNS server 92 determines the appropriate Internet Protocol (IP) address for the specified domain name associated with the message file 100. Once the SMTP server 90 has all necessary information from the DNS server 92, the message file 100 can be sent from the SMTP server 90 to the mail exchange server of the target domain, also referred to as a Mail Transfer Agent (MTA) server 94. It should be understood that the message file 100 may have to be forwarded to additional SMTP servers before being received by the MTA server 94.

If the recipient email address is directed toward an account found locally at the customer site 1, the SMTP server 90 may simply transfer the message file 100 to an email retrieval server 96 found at the customer site 1. The email retrieval server 96 refers to any email server having the ability to sort and store email messages to an appropriate mailbox located within a memory of the email retrieval server 96. The file message 100 in the form of an email message may then be retrieved from the email retrieval server 96 using standard email message access protocols, such as Post Office Protocol (POP) and Internet Message Access Protocol (IMAP). Accordingly, the email retrieval server 96 may be commonly referred to as a POP server or an IMAP server.

Alternatively, the MTA server 94 may be found at a remote site 2, The MTA server 94 found at the remote site 2 may for instance be a remote server used to collect the message files 100 from a plurality of customer sites 1 each having at least one robot 20 and at least one associated robot controller 40. If the MTA server 94 is located at the remote site 2, the message file 100 is relayed via standard email communications protocol from the SMTP server 90 to the remotely located MTA server 94. The MTA server 94 recognizes whether the message file 100 is for a recipient having a mailbox at the MTA server 94 and transfers the message file 100 to the appropriate email retrieval server 96 also located at the remote site 2. The email retrieval server 96 places the message file 100 in the appropriate recipient mailbox. An operator may access the message file 100 using an email client in the form of the smart device 12. The message files 100 stored within the appropriate mailbox of the email retrieval server 96 may be accessed by the smart device 12 using standard email message access protocols such as POP or IMAP. It should be understood that the message file 100 may be placed in multiple recipient mailboxes by the MTA server 94 if the robot controller 40 designates multiple recipients when the message file 100 is originally sent by the robot controller 40.

Alternatively, the storage system 50 may be included in the robot monitoring system 10 as a remote storage system 54. Referring now to FIG. 3, the communication device 45 (FIG. 1) of the robot controller 40 is configured to gather and format the message file 100 for sending from the communication device 45 to the remote storage system 54 via known internet protocol. The remote storage system 54 may be in the form of a remote server located at the remote site 2. The remote storage system 54 receives the message file 100 and stores the message file 100 to an appropriate location in a memory 64 of the remote storage system 54. Using standard Internet protocol, an operator may access the message file 100 using the smart device 12.

The storage system 50 may also be included in the robot monitoring system 10 in the form of a local storage system 56 located at the customer site 1. Referring now to FIG. 4, the local storage system 56 may comprise the robot controller memory 44 or a distinct server in local communication with the robot controller 40. The local communication may be formed through the use of a cable or wireless communication, as desired. The local storage system 56 receives the message file 100 and stores the message file 100 to a proper location within the local storage system 56. For instance, the message file 100 may be stored to the local storage system 56 via file write operations to the robot controller memory 44. An operator at the customer site 1 may access the message file 100 by uploading the file to the smart device 12. The message file 100 may be uploaded to the smart device 12 using a direct local connection between the local storage device 56 and the smart device 12. The message file 100 may also be accessed through the teach pendant 70. The teach pendant 70 may be in communication with the robot controller memory 44, and the smart device 12 may then be in local communication with the tech pendant 70. The local communication may be formed through a USB connection, a Bluetooth® connection, or any other known method of short-range local connection.

The smart device 12 comes equipped with a smart communication device 13 for receiving the message file 100 and a smart device application 14 for reading and decoding the message file 100 as shown in FIG. 1. It should be understood that the smart communication device 13 may be specific to the smart device 12, and may include the ability to receive the message file 100 using any known protocols, including internet protocols, email protocols, and the like. It should also be understood that the smart device application 14 may be stored in a memory 18 of the smart device 12. Once the message file 100 has been received by the smart device 12 from the email server system 52, the remote storage system 54, or the local storage system 56, the robot related data contained within the message file 100 is decoded (parsed) by the smart device application 14 and stored to the memory 18 of the smart device 12. The information decoded from the message file 100 may be sorted and stored to the memory 18 of the smart device 12 based upon the structure and the content of the robot related data contained within the message file 100, creating a database of robot related data and robot conditions within the memory 18 of the smart device 12. If any additional files have been attached for use with the message file 100, such as the digital photographic image for instance, the additional file will be stored to the memory 18 of the smart device 12 and associated with the robot related data with which the additional file was originally sent.

The smart device application 14 is configured to sort the robot related data contained within the message file 100 into predetermined categories based upon the structure and the content of the robot related data contained within the message file 100. For instance, the categories may be defined by the primary task of the robot 20 associated with the message file 100 (welding, painting, etc.) or a particular system or job task area located at the customer site 1. Alternatively, the robot related data may be categorized by the types of events that triggered the creation of the message file 100. The robot related data may be categorized according to production status, process information, preventative maintenance alerts, diagnostic alerts, vision data, robot condition, and application specific information, for instance.

The smart device 12 includes a display 15 for visually communicating the robot related data contained within the message file 100 to a user of the smart device 12. The smart device application 14 is configured to generate indicia 16 on the display 15 representing the robot related data. The indicia 16 may be presented based on the categories to which the smart device application 14 stores the robot related data. For instance, each of the indicia 16 may represent an independent robot system located at the customer site 1 (or multiple customer sites) or the robot related data may be categorized by production status, process information, etc. It should be understood that the smart device application 14 may sort and categorize the same robot related data under a plurality of different categories, allowing for the robot related data to be accessed by various different paths while navigating the smart device application 14. It should be understood that the method of navigating the smart device application 14 may be specific to the selected smart device 12. For instance, many mobile devices may utilize a touch-screen interface while a desktop or laptop computer may utilize a mouse and keyboard interface.

Figure 5A:
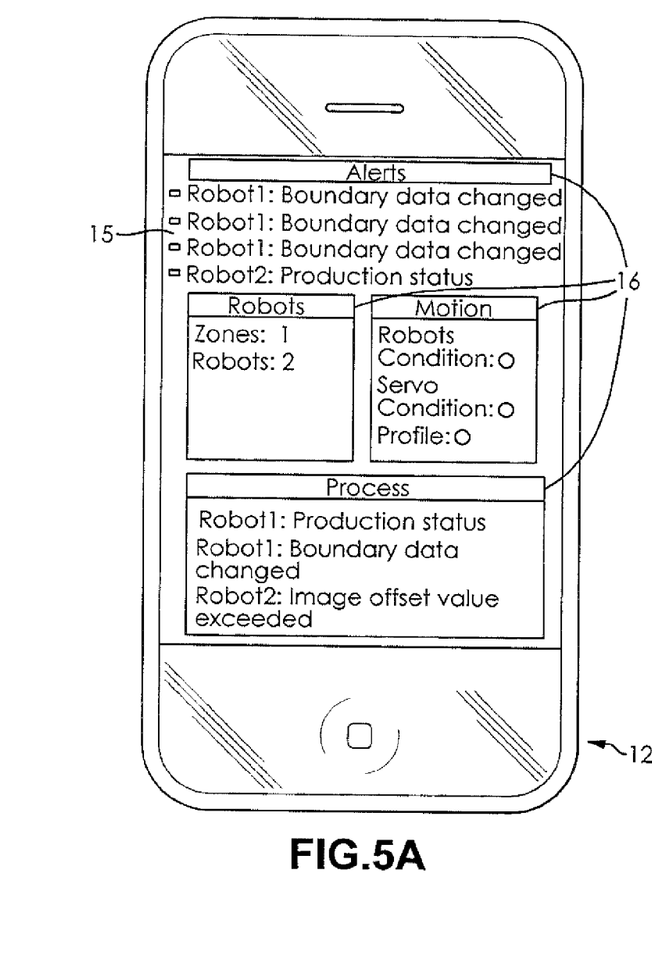
FIG. 5A shows an information display generated by the system according to the invention.
Figure 5B:
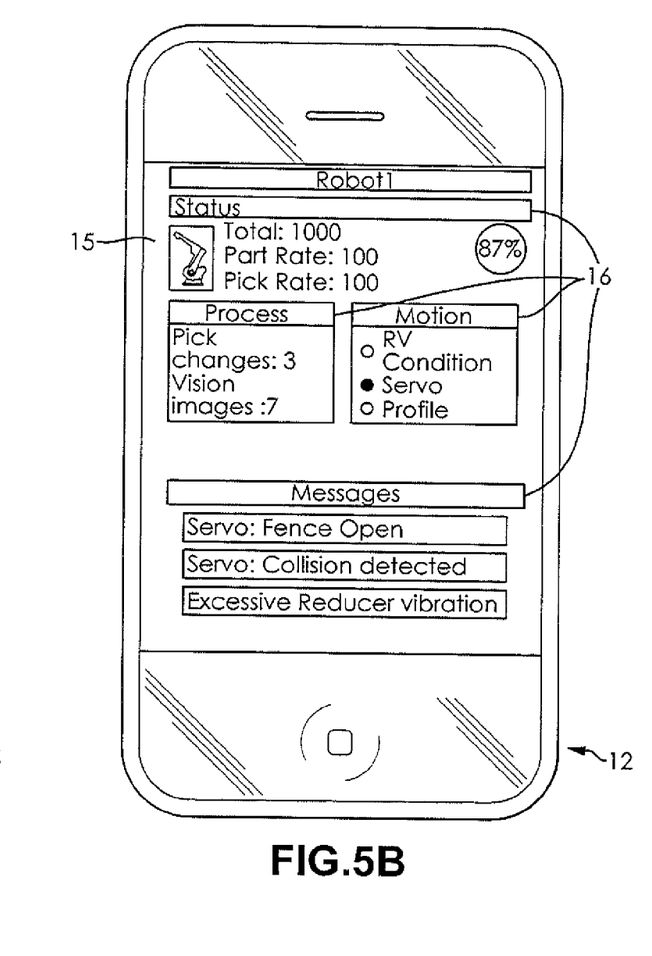
FIG. 5B shows an alternate information display generated by the system according to the invention.

Exemplary representations of the display 15 of the smart device 12 are shown in FIGS. 5A and 5B. FIG. 5A shows a display 15 in a "multiple robot view" configuration, where robot related data corresponding to multiple robots 20 is shown simultaneously using indicia 16 representing alerts, robots, motion, and process information. FIG. 5B shows a display 15 in a "single robot view" configuration, where robot related data corresponding to a single one of the robots 20 is shown using indicia 16 representing a status of the robot, process information, motion information, and any messages corresponding to the one of the robots 20. It should be understood, however, that many alternative configurations and choices of indicia 16 may be used depending on the smart device 12, the smart device application 14, and the customization of the robot monitoring system 10 using the teach pendant 70.

The smart device application 14 may be configured to only access the message files 100 contained within the storage system 50 when the smart device 12 has an active connection to the storage system 50. In such cases, the smart device application 14 downloads the desired message files 100 with the associated robot related data every time a user chooses to access the storage system 50 via the smart device application 14, and the message files 100 and all associated robot related data is stored to the memory 18 of the smart device 12 during use of the smart device application 14. Alternatively, the smart device application 14 may cache certain robot related data or permanently store selected robot related data to the memory 18 of the smart device 12 so the information can be accessed even when an active connection is not established with the storage system 50.

The smart device application 14 may be further configured to receive message files 100 in the form of an instant alert 110 (FIG. 6) sent to the smart device 12 shortly after the event triggering the creation of the message file 100. As explained hereinabove, the smart device 12 and the smart device application 14 access the robot related data stored on the storage system 50 when the smart device application 14 accesses the storage system 50 at the prompting of the user of the smart device 12, also referred to as "pull" notification. In some instances, however, it may be preferable for the smart device 12 to receive an instant alert 110 when the robot related data indicates an event requiring instant notification, such as the robot 20 becoming damaged or inoperable. This method of sending the relevant robot related data to the smart device 12 is commonly referred to as "push" notification. It should be understood that the types of robot related data triggering the generation of an instant alert 110 may be customized by an operator of the robot monitoring system 10. The customization may occur by programming the robot controller 40 and/or the storage system 50 to recognize certain robot related data as indicating the need for an instant alert 110. As explained hereinabove, the teach pendant 70 may be used to program the robot controller 40 regarding the types of robot related data that trigger the sending of a message file 100. Similarly, the teach pendant 70 may also be used to customize which types of robot related data triggering a message file 100 also trigger the need for the generation of an instant alert 110.

The determination of what robot related data is sent as an instant alert 110 may be initially determined by either the robot controller 40 or the storage system 50. If the robot controller 40 is used to make the determination, the robot controller memory 44 may have stored therein a listing of types of robot related data that may trigger the need for an instant alert 110. The robot controller 40 analyzes the robot related data and further formats a corresponding message file 100 to have a predetermined identifier such that the storage system 50 may recognize the message file 100 as needing to be immediately forwarded to the smart device 12 in the form of an instant alert 110. Alternatively, the robot controller 40 may send a message file 100 to the storage system 50 wherein the storage system 50 further sorts the robot related data contained within the message file 100. The storage system 50 may be configured to recognize a predetermined form of robot related data contained within the message file 100 causing the storage system 50 to sort the robot related data into a category indicating that certain robot related data contained within the message file 100 is to be sent to the smart device 12 as an instant alert 110.

Once the storage system 50, whether it be in the form of the email server system 52 or the remote storage system 54, determines that it has received robot related data indicating that an instant alert 110 should be sent to the smart device 12, the storage system 50 "pushes" the notification to the smart device 12 using known methods of push notification. For instance, Apple Push Notification Service® (APNS) allows a smart device 12 (such as an Apple iPhone) to maintain a constantly open IP connection that allows third party servers, such as the email server system 52 or the remote storage system 54, to push a notification to the smart device 12 whenever such a notification has been received. It should be understood that other known push notification methods may be used depending on the supplier mechanism for the smart device 12, including HTTP server push, Pushlet, and long polling.

In many instances, a single operator of the system 10 may have multiple smart devices 12 to which the operator would like each instant alert 110 to be sent. Accordingly, each instant alert 110 is further formatted to identify which smart devices 12 are designated by the operator of the system 10 for receiving the instant alert 110. This additional information may be added to the instant alert 110 by the robot controller 40 prior to being forwarded to the storage system 50. The storage system 50 then interrogates the instant alert 110 to determine which smart devices 12 receive the instant alert 110 through the associated push notification method. Alternatively, the storage system 50 may have the relevant information relating to which smart devices 12 are to receive the instant alerts stored in the memory of the storage system 50, and the receiving of an instant alert 110 triggers the pushing of the instant alert 110 to all designated smart devices 12.

Security for the system 10 may be achieved by the smart device application 14 running on the smart device 12 requesting a customer provided password each time the smart device 12 attempts to receive a message file 100 or an instant alert 110 from the storage system 50, and especially when the message file 100 or instant alert 110 is "pulled" from the storage system 50. Accordingly, each time the smart device 12 attempts to pull information from the storage system 50 the smart device application 14 prompts the user of the smart device 12 to enter the corresponding password. The user enters the password and the smart device 12 communicates the password to the storage system 50 using known communication protocols. The storage system 50 checks the validity of the password against passwords stored in the memory of the storage device 50. If a match is found, the storage system 50 continues to communicate any pending message files 100 or instant alerts 110 to the smart device 12.

In use, an operator of the robot monitoring system 10 may first define the events that trigger the generation of a message file 100 as well as the types of robot related data to be sent with the message file 100 using the teach pendant 70. The operator navigates the teach pendant programming software 72 running on the teach pendant 70 using the display and the interface of the teach pendant 70. The teach pendant programming software 72 is used to define the triggering events that cause the message file 100 to be communicated from the robot controller 40 to the storage system 50. Alternatively, the triggering events may be defined within the robot monitoring system 10 by updating or replacing the at least one local software application 60 running within the robot monitoring system 10 to recognize that predetermined triggering events cause the robot controller 40 to gather and analyze specified robot related data for formatting into a message file 100.

During operation of the robot 20, the robot controller 40 and the robot 20 are in constant local communication. A predetermined triggering event specified by the operator triggers the robot controller 40 to gather and analyze all robot related data from the robot 20 and the robot controller 40 that has been predetermined to be relevant to the generation of the message file 100. The robot controller 40 formats the robot related data and may also convert any additional files into a text based format for attachment therewith, creating a single multi-part message in the form of the message file 100. The message file 100 is then forwarded by the communication device 45 of the robot controller 40 to the storage system 50. As explained hereinabove, the storage system 50 may be in the form of any of an email server system 52, a remote storage system 54, and a local storage system 56.

If the email server system 52 is used, the communication device 45 of the robot controller 40 functions as mail client and forwards the message file 100 to an SMTP server 90 located at the customer site 1. The SMTP server 90 contacts a DNS server 92 to determine the appropriate IP address for the specified domain name indicated within the message file 100. The message file 100 is then sent from the SMTP server 90 to the MTA server 94. The MTA server 94 confirms that the recipient has a mailbox located at the MTA server 94. Once confirmed, the MTA server 94 transfers the message file 100 to the email retrieval server 96, which places the message file 100 in the appropriate recipient mailbox. The email retrieval server 96 interrogates the message file 100 to determine if the message file 100 contains robot related data that must be forwarded to the smart device 12 in the form of an instant alert 110. If the email retrieval server 96 determines that an instant alert 110 must be sent, the email retrieval server 96 forwards the instant alert 110 to the smart device 12 using known "push" notification methods or protocols.

If the remote storage system 54 is used, the communication device 45 of the robot controller 40 sends the message file to the remote storage system 54 using known Internet protocols. The remote storage system 54 receives the message file 100 and stores the message file 100 to the memory 64 of the remote storage system 54. The remote storage system 54 interrogates the message file 100 to determine if the message file 100 contains robot related data that must be forwarded to the smart device 12 in the form of an instant alert 110. If the remote storage system 54 determines that an instant alert 110 must be sent, the remote storage system 54 forwards the instant alert 110 to the smart device 12 using known "push" notification methods or protocols.

If the local storage system 56 is used, the operator of the robot monitoring system 10 first connects the teach pendant 70 to the robot controller 40. The operator then connects the smart device 12 to the teach pendant 70 using a known form of local communication, for instance, a USB cable or Bluetooth technology. The robot controller 40 transfers the message file 100 to the teach pendant 70 which in turn transfers the message file 100 to the smart device 12. As shown in FIG. 4, the smart device 12 also can connect directly to the robot controller 40.

The user of the smart device 12 first downloads the smart device application 14 for the receiving and analyzing of the message file 100. The user opens the smart device application 14 and the user is prompted to provide a password. The smart device 12 communicates with the storage system 50 and determines if the correct password has been provided. Once the correct password has been entered, the storage system 50 sends the message file 100 to the smart device 12 using known communication protocols. Upon receiving the message file 100, the smart device 12 analyzes the message file 100 and sorts the robot related data contained therein into predetermined categories. The predetermined categories are presented on a display 15 of the smart device 12 in the form of indicia 16. A user of the smart device 12 navigates the smart device application 14 using the provided interface for the smart device 12, such as a touch screen display or a keyboard. The user may then select one of the indicia 16 representing one of the categories of the robot related data for displaying the data in a format readable to the user.

If the message file 100 is sent as an instant alert 110, the smart device 12 may prompt the user for a password before allowing access to the robot related data sent in the instant alert 110. The smart device application 14 may preferably be configured to generate a notification to the user using known smart device notification methods, such as haptic feedback or the playing of a notification sound. The robot related data is then presented to the user through the display 15 of the smart device 12. It should also be understood that the receiving of the instant alert 110 may cause the smart device 12 to present the robot related data through the smart device application 14 in a manner similar to the message file 100.

Figure 6:
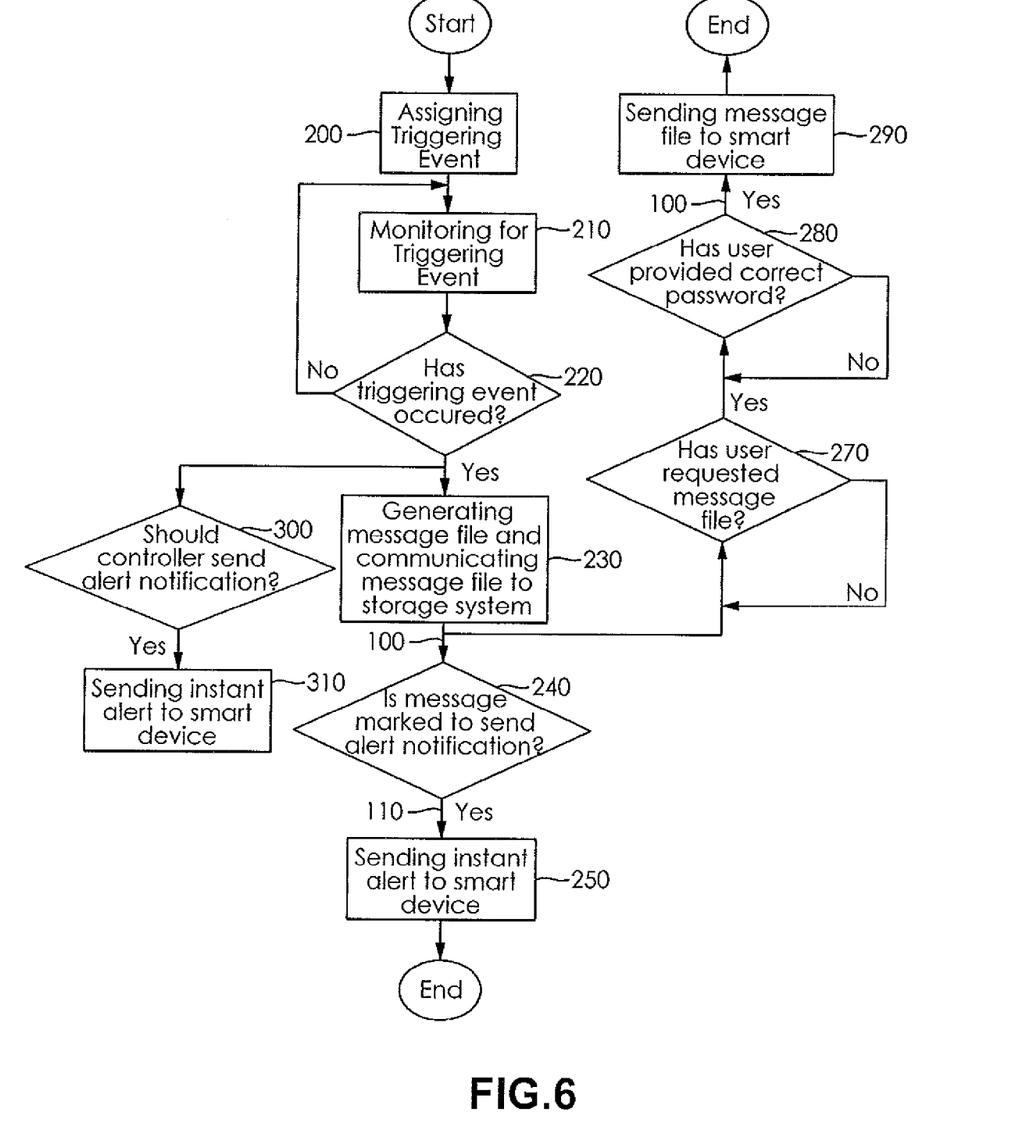
FIG. 6 is a flow diagram of the method of monitoring a robot system according to the invention.

A flow diagram of the method of monitoring a robot system according to the invention is shown in FIG. 6. The method starts at a step 200 by assigning at least one triggering event to be monitored. Then the system 10 monitors for the occurrence of the triggering event in a step 210. A periodic check for the occurrence of the triggering event is made at a decision point 220. If the triggering event has not occurred, the method branches at NO back to the step 210. If the triggering event has occurred, the method branches at YES to at step 230 to generate the message file 100 and communicate that message file to the storage system 50. The method then enters a decision point 240 to check whether the message file is marked to be sent as the alert notification 110. If it should, the method branches at YES to a step 250 to send the instant alert 110 to the smart device 12.

The method also goes from the step 230 to enter a decision point 270 to check whether the user has requested the message file 100. If there is no request, the method branches at NO to perform the check 270 again on a periodic basis. If there is a request, the method branches at YES to a decision point 280 to check for a correct password entered by the user. If the password is incorrect or not entered, the method branches at NO to check again for a correct password. If a correct password has been provided, the method branches at YES to a step 290 wherein the message file 100 is sent to the smart device 12.

The robot controller 40 also can provide alerts. The YES branch from the decision point 220 also enters a decision point 300 to check whether the controller should send an alert notification. In a step 310 the controller 40 sends an alert to the smart device 12 if directed by the program to do so.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A robot monitoring system for monitoring and analyzing robot related data and displaying the data on a smart device, the system comprising:
   at least one robot;
   at least one robot controller in communication with the at least one robot, wherein the at least one robot controller has local processing power and is configured to cause the at least one robot to perform a programmed movement, and wherein the at least one robot controller is further configured to monitor and analyze robot related data to determine a condition of the at least one robot, wherein the at least one robot controller further includes a communications device for communicating the condition of the at least one robot to a storage system, wherein the storage system is at least one of an email server system, a remote storage system, and a local memory of the at least one robot controller; and
   at least one software application running on the at least one robot controller collects and analyzes robot related data to determine a running condition of the at least one robot, and the at least one software application further defines triggers that can be activated to communicate the running condition of the at least one robot from the robot controller to the storage system, and
   wherein upon one of the triggers occurring, the at least one software application formats a result of the robot related data analysis for communicating the running condition of the at least one robot as a message file and communicates the message file to the storage system, the storage system responding to a request from a user of the smart device for the message file and where the user has requested the message file and provided a correct password the message file is sent from the storage system to the smart device.

2. The system according to claim 1, wherein the at least one software application interrogates the message file to determine whether an alert notification is to be forwarded to the smart device using push notification protocols.

3. The system according to claim 1, wherein the at least one software application formats a result of the robot related data analysis for communicating the running condition of the at least one robot as the message file using a unique protocol.

4. The system according to claim 3, wherein the unique protocol includes the data analysis results being formatted into a plurality of nodes, wherein every node has an id name and the ability to store historical data in a sub node structure, and there is a file tag node to structure an attached file to reference specified data.

5. The system according to claim 3, wherein the message file may further include additional data files for attachment to and sending with the data analysis results.

6. The system according to claim 1, wherein the at least one robot controller is in local communication with a teach pendant, wherein the teach pendant includes the at least one software application running thereon for customizing a triggering event indicating that the running condition of the at least one robot is to be communicated to the storage system.

7. The system according to claim 1, wherein the storage system is the email server system, wherein the at least one robot controller acts as a mail client for communicating the condition of the robot in the message file in the form of an email message file; wherein the email message file is received by an email retrieval server configured to sort and store the email message file to an appropriate mailbox located within a memory of the email retrieval server.

8. The system according to claim 7, wherein the email retrieval server interrogates the email message file to determine if an alert notification is to be forwarded to the smart device using push notification protocols.

9. The system according to claim 1, wherein the smart device includes a smart device application running thereon configured to receive the running condition of the at least one robot in the form of Hap the message file, wherein the message file is sorted and stored to a memory of the smart device into categories based upon the structure and the content of the robot related data contained within the message file, creating a database of robot related data within the memory of the smart device.

10. The system according to claim 9, wherein the smart device further includes a display for visually communicating the running condition of the at least one robot to a user of the smart device; wherein the display generates indicia and the indicia may be presented based on the categories to which the smart device application stores the robot related data.

11. A method for monitoring, analyzing and displaying robot related information on a smart device comprising the steps of:
    providing at least one robot in communication with at least one robot controller having local processing power and configured to cause the at least one robot to perform a programmed movement, and a storage system in communication with the at least one robot controller, wherein the storage system is at least one of an email server system, a remote storage system, and a local storage system;
    running at least one software application on the at least one robot controller to monitor, collect and analyze robot related data using the local processing power of the at least one robot controller to determine a running condition of the at least one robot, the at least one software application further defining triggers that are activated to communicate the running condition of the at least one robot from the robot controller to the storage system,
    formatting by the at least one software application a result of the robot related data analysis as a message file for communicating the running condition of the at least one robot, upon one of the triggers occurring;
    communicating the message file from the at least one robot controller to the storage system;
    receiving by the storage system a request from a user of the smart device for the message file; and
    communicating the message file from the storage system to the smart device where the user has requested the message file and provided a correct password.

12. The method according to claim 11, wherein the forming of the message file includes formatting the result of the robot related data analysis.

13. The method according to claim 12, wherein the result of the robot related data analysis is formatted using a unique protocol, wherein the unique protocol includes the result of the robot related data analysis being formatted into a plurality of nodes, wherein every node has an id name and the ability to store historical data in a sub node structure, and there is a file tag node to structure an attached file to reference specified data.

14. The method according to claim 11, further including the step of decoding, sorting, and storing the robot related data analysis results contained within the message file, wherein the robot related data is decoded by a smart device application running on the smart device that sorts the robot related data analysis results into categories based on a structure and a content of the robot related data contained within the message file, and wherein the robot related data is stored to a memory of the smart device based on the categories of robot related data.

15. The method according to claim 11, wherein the smart device reads the robot related data analysis results contained within the message file via one or more of the following methods: email content and attached files; robot controller memory through a short distance communication link; and a file stored on a remote storage system.

16. The method according to claim 11, wherein the storage system interrogates the message file to determine if an instant alert is sent to the smart device through smart device protocols for push notification.

17. The method according to claim 11, wherein the storage system interrogates the received file message to determine all assigned user smart devices for sending an instant alert through a smart device supplier mechanism to the assigned user smart devices.

18. The method according to claim 11, wherein the robot controller interrogates the message file to determine if an instant alert is to be sent to the smart device through smart device protocols for push notification.

* * * * *